United States Patent [19]
Harada et al.

[11] Patent Number: 5,097,432
[45] Date of Patent: * Mar. 17, 1992

[54] EVALUATION METHOD OF FLOW ANALYSIS ON MOLDING OF A MOLTEN MATERIAL

[75] Inventors: Susumu Harada; Shigeru Fujita, both of Shizuoka, Japan

[73] Assignee: Toshiba Machine Co., Ltd., Tokyo, Japan

[*] Notice: The portion of the term of this patent subsequent to Mar. 17, 2009 has been disclaimed.

[21] Appl. No.: 595,769

[22] Filed: Oct. 10, 1990

Related U.S. Application Data

[63] Continuation of Ser. No. 241,201, Sep. 7, 1988, abandoned.

[30] Foreign Application Priority Data

Sep. 8, 1987 [JP] Japan .................................. 62-223071
Sep. 8, 1987 [JP] Japan .................................. 62-223072

[51] Int. Cl.⁵ .......................... G06F 15/46; B29G 3/00
[52] U.S. Cl. ...................................... 364/578; 364/510; 364/550; 364/476; 425/170; 264/328.1
[58] Field of Search ............... 364/510, 550, 578, 557, 364/518, 521, 476; 340/618, 622; 264/327, 328.1; 425/169, 170, 171, 173

[56] References Cited

U.S. PATENT DOCUMENTS

| | | | |
|---|---|---|---|
| 4,534,003 | 8/1985 | Manzione | 364/510 |
| 4,597,048 | 6/1986 | Mazur et al. | 364/510 |
| 4,642,777 | 2/1987 | Schwanke | 364/510 |

Primary Examiner—Parshotam S. Lall
Assistant Examiner—Brian M. Mattson
Attorney, Agent, or Firm—Young & Thompson

[57] ABSTRACT

An evaluation method of a flow analysis on molding of a molten material is achieved in a system of performing a flow analysis on an in-mold molten material through breakdown of a molded part model into minute elements and numerical analysis thereof including the calculi of finite elements, boundary elements, finite differences, FAN and the like. One or more temperature conditions of the molten material are provided with a plurality of loading times respectively for conducting an analysis and from the obtained operational results of the temperature distribution of the molten material after loading, an average temperature or a medium layer temperature of each element is calculated as a function $Tn = fn(t)$ having a variable of the loading time. This function is graphically indicated on a display apparatus to determine the ranges of the molten material temperature and the loading time at a predetermined mold temperature.

4 Claims, 7 Drawing Sheets

EQUIVALENT
TIME LINE LEVEL 1   1.000E-1
2   2.000E-1
3   3.000E-1
4   4.000E-1
5   5.000E-1
6   6.000E-1
7   7.000E-1
8   8.000E-1
9   9.000E-1
10  1.000E0

EQUIVALENT
PRESSURE LINE
LEVEL
1  1.0000E1
2  1.7500E1
3  2.5000E1
4  3.2500E1
5  4.0000E1
6  4.7500E1
7  5.5000E1
8  6.2500E1
9  7.0000E1
10 7.7500E1

EQUIVALENT
TEMPERATURE
LINE LEVEL
1  2.3600E2
2  2.3800E2
3  2.4000E2
4  2.4200E2
5  2.4400E2
6  2.4600E2
7  2.4800E2
8  2.5000E2
9  2.5200E2
10 2.5400E2

EVALUATION METHOD OF FLOW ANALYSIS ON MOLDING OF A MOLTEN MATERIAL

This application is a continuation of application Ser. No. 07/241,201, filed Sept. 7, 1988, now abandoned.

FIELD OF THE INVENTION

This invention relates to an evaluation method for determining the optimum process parameters for obtaining a molded part of high quality during molding of molten materials such as resin, more particularly to an evaluation method for determining the optimum ranges of the molten material temperature and the loading time at a predetermined mold temperature.

BACKGROUND OF THE INVENTION

Hitherto, in case of performing an analysis involving simulation of a resin flow within a mold during injection-molding of resin materials, there has been generally exercised a method of applying the equations of motion, continuation and energy of the fluid by providing a molded part model into minute elements and performing numerical analysis thereof including the calculi of finite elements, boundary elements, finite differences, FAN and the like, as shown in FIG. 1.

In such an analysis of a resin flow within a mold, the selection of a resin to be used and the operational characteristics of a molding machine such as resin temperature, mold temperature and loading speed are input for operation, so that the required calculations are carried out to generate a loading pattern such as that shown in FIG. 2 showing a loading process or time of the resin, a pressure distribution such as that shown in FIG. 3, a temperature distribution such as in FIG. 4 and the like.

The conventional resin flow analysis as described hereinbefore, however, provides no means for determining whether or not input conditions are appropriate, whether or not there are more appropriate input conditions, or which is the best among available input conditions. Accordingly, the operating results must have been determined relying on the experimental know-how obtainable only from repeated comparisons between the analytic results and the actual moldings.

Thus, the conventional analysis method has been carried out by inputting the resin temperature, the mold temperature and the loading speed suggested by experiments for the purpose of determining the suitabilities of the shape of the molded part such as the part thickness, the location and number of gates, the runner size and the like, but has not yet been applied to the evaluation of the suitabilities of the molding conditions themselves.

Such an analysis method, on the other hand, seeks to determines the suitability and difficulty of molding on account of operations by a program before manufacturing a mold at a stage when a design for a resin molded part has been completed thereby to fulfill the required conditions for production of the molded parts, and such method is desired not only to determine the suitability of the mold shape such as the part thickness, the location and number of gates, measurements of a gate and a runner and the like, but also to calculate an appropriate range of the molding conditions or the optimum molding conditions so as finally to determine the operational parameters of a molding machine.

Accordingly, the invention seeks to provide an evaluation method of flow analysis for molding of a molten material to determine the optimum ranges of the molten material temperature and the loading time at a predetermined mold temperature.

SUMMARY OF THE INVENTION

In order to achieve the above object, the invention provides an evaluation method of flow analysis for molding of a molten material by a system of making a flow analysis on an in-mold molten material through breakdown of a molded part model into minute elements and numerical analysis thereof including the calculi of finite elements, boundary elements, finite differences, FAN and the like, wherein one or more temperature conditions of the molten material are associated with a plurality of loading times respectively for conducting analysis and from the obtained operational results of the temperature distribution of the molten material after loading, an average temperature or a medium layer temperature of each element is calculated as a function $Tn = f\,n(t)$ having a variable of loading time, the function being graphically indicated on a display apparatus to determine the ranges of the molten material temperature and the loading time at a predetermined mold temperature.

In the above evaluation method, an average temperature or a medium layer temperature of each element after the loading is represented by a function $Tn = f\,n_1(t)$ having a variable of the loading period of the maximum molten material temperature of all elements, the function being evaluated by giving a critical value to a deviation $\Delta Tn$ between the function of the maximum molten material temperature and the molten material temperature when flowing into the mold so as to determine appropriate ranges of the molten material temperature and the loading time.

In this case, an average temperature or a medium layer temperature of each element when the mold loading is finished may be represented as a function $Tn = f\,n_1(t)$ having a variable of the loading time of the maximum molten material temperature of all elements with a critical value given to a differential value $dTn/dt$ of said function so as to evaluate the function for determination of appropriate ranges of the molten material temperature and the loading time.

Furthermore, an average temperature or a medium layer temperature of each element when the mold loading is finished may be represented as a function $Tn = f\,n_2(t)$ having a variable of the loading time of the minimum molten material temperature of all elements with a given critical value according to the solidification temperature Ts of the molten material employed so as to evaluate the function for determination of the temperature range incapable of molding the molten material as well as the range of the loading time.

According to the evaluation method of the invention, on account of the operation results of the temperature distribution of a molten material when the loading operation finished, is the maximum molten material temperature of all the elements at an average temperature or a medium layer temperature of each broken-down element of a molded part may be represented as a function having the loading time as a variable, while the minimum molten material temperature of each element may be represented as a function having the loading time as a variable, the functions being graphically indicated by a display means for evaluation of the optimum ranges of the molten material temperature and the loading time.

In this case, a critical value may be applied to a deviation between the function of the maximum molten material temperature when the loading operation is finished and the molten material temperature upon flowing or a critical value may be imparted to a differential value of said functions for determination of appropriate ranges of the molten material temperature and the loading time taking the influence of the shear exothermic heat or stability of the molten material temperature with variation of the loading time into consideration.

Furthermore, the following molding conditions are generally required as the judging criteria for the flow analysis of molding of molten materials such as resin materials:

(1) A loading time is preferably short
(2) A loading pressure is preferably low
(3) A resin temperature is preferably low
(4) A mold temperature is preferably low Namely, since a molten resin at a high temperature is charged into a mold at a low temperature on the loading process, the resin is cooled on loading, so that the temperature thereof is lowered while increasing the viscosity thereof, resulting in lowering of the fluidity.

Accordingly a slow loading speed causes an insufficient pressure transmission likely resulting in an inferior formation. For example, the uneven surface caused by the flow in the vicinity of the mold cavity end is not susceptible to a close contact with the surface of the mold cavity, leaving flow marks, or the shrinkage in a cooling process may not be rectified with resulting formation of sink marks or an insufficient re-welding of the weld portion where the resin flows are joined will produce undesired weld lines with deficiency in strength at the weld portion.

It is desired to finish the loading operation as short a time as possible. An excessively fast loading operation, however, causes various inferior phenomena like a deterioration to be brought by a partial heating of the resin by the shear exothermic heat in flowing, silver streaks to be formed on the surface of the molded part through gasification of the volatile matters contained, gas marks to be developed by a resin flow sealing the air remaining in a mold cavity for compression with heat insulation and jettings produced when a flow channel is not fully filled at the portion where the sectional area thereof is rapidly enlarged to form a strip flow with folding.

There is provided a controlling system for programming a loading speed in a multistage in accordance with a variation of the sectional area of the flow channel within a mold cavity so as not to form the portion where the flow speed in the mold becomes excessively fast but to finish the loading operation in as short a time as possible without entailing any defects as hereinbefore described.

Moreover, the loading pressure is generally produced as a load resistance when a molten material of a certain viscosity is filled into a mold at a certain temperature and at a certain speed, and it may be represented by the oil pressure of an injection cylinder for filling or by a molten resin pressure to be actually measured in a mold. Namely, the loading pressure is a parameter for indicating an easiness of the filling operation, for instance, a low filling pressure ensuring a convenient filling operation as a desired condition. In case of a continuous molding operation, a constant filling pressure value at every shot enables production of invariable and steady quality.

A molten resin temperature and a mold temperature provide molding conditions relating to the apparent viscosity for indicating fluidity of the resin. The higher both temperatures are, the lower the apparent viscosity is, resulting in a convenient filling operation. On the other hand, in case of a cycle operation of injection molding wherein a molded part after being cooled is withdrawn from the mold, the molding cycle is retarded by the high temperatures.

Accordingly, when the molten resin viscosity is held at a certain level to satisfy the magnitude and stability of the filling pressure, the thermal conditions of the resin and the mold may preferably be low.

For better understanding, the invention will now be described hereinbelow in more detail with reference to the accompanying drawings.

PREFERRED EMBODIMENTS OF THE INVENTION

Figure 1:
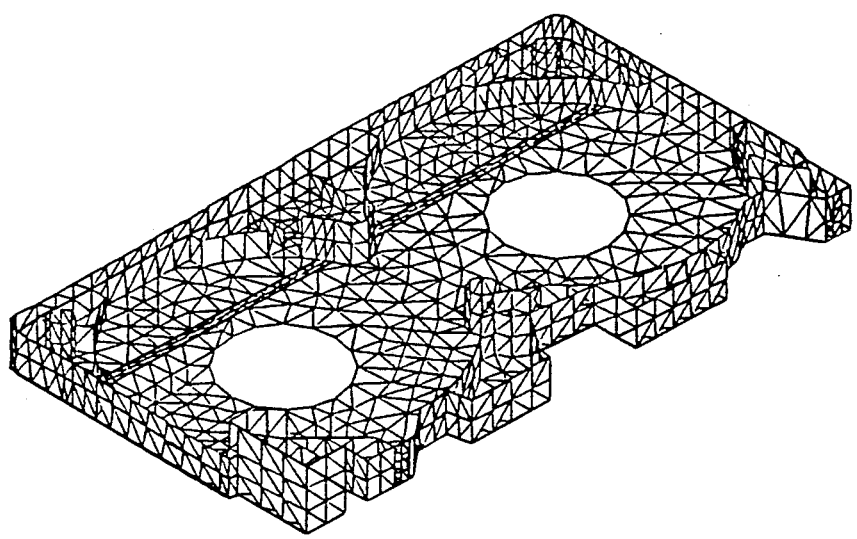
FIG. 1 is a graphical representation of a molded part model broken down into three-dimensional minute elements.
Figure 2:
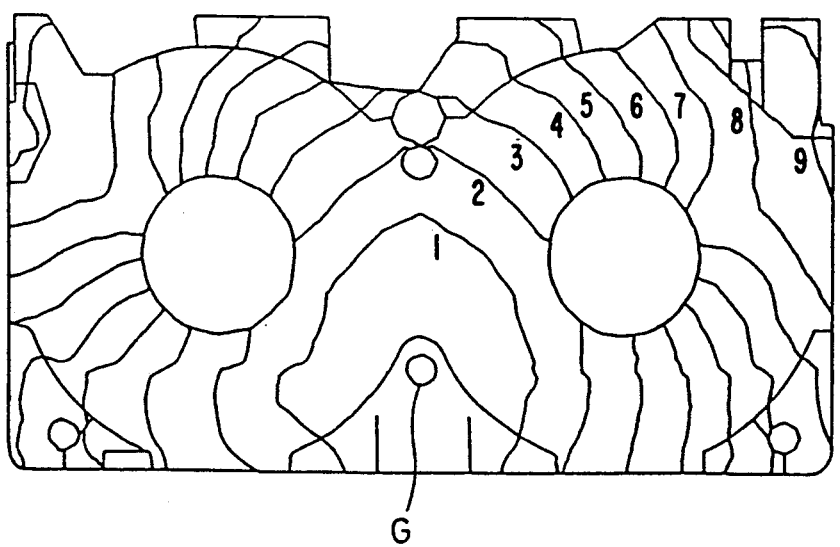
FIG. 2 is a uniform time line view of the loading pattern in the molded part model of FIG. 1.
Figure 3:
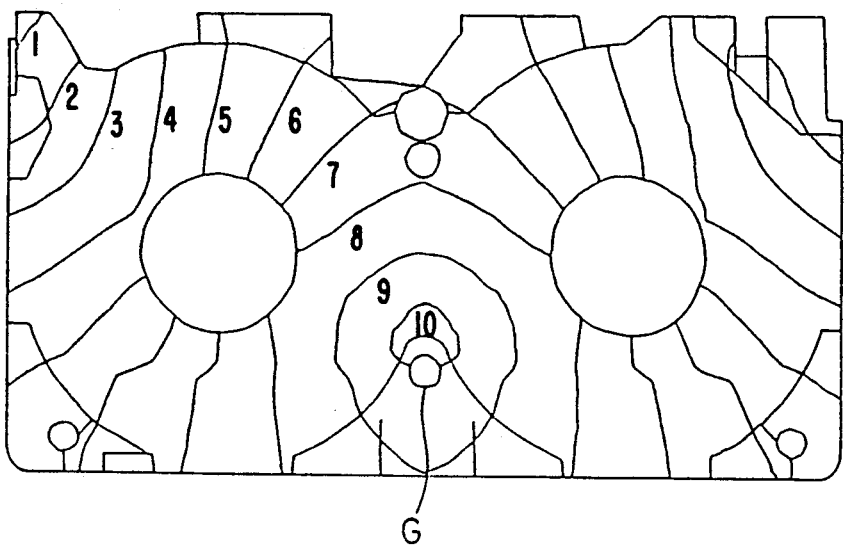
FIG. 3 is a uniform pressure line view of a loading pattern in the molded part model of FIG. 1.
Figure 4:
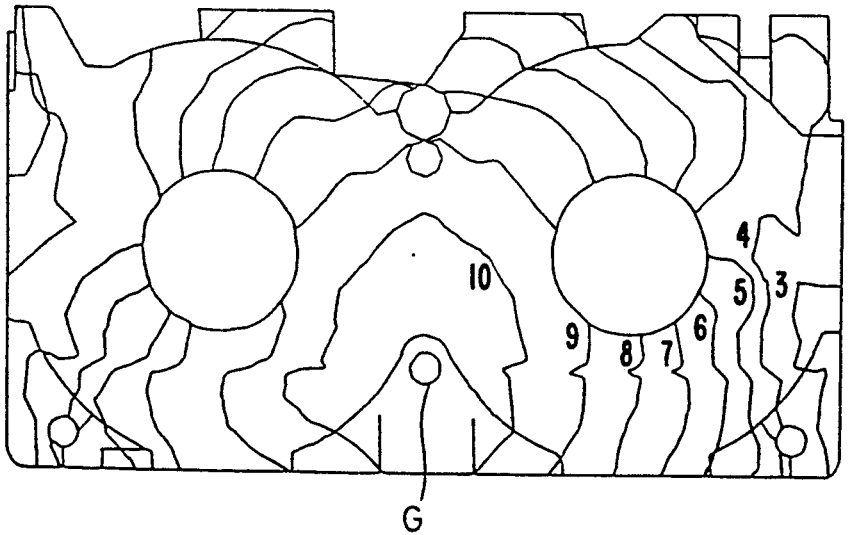
FIG. 4 is a uniform temperature line view of a loading pattern in the molded part model of FIG. 1.

In the invention, a procedure of conducting a resin flow analysis within a mold for a desired molded part model is substantially same as the conventional simulation method. Namely, as shown in FIG. 1, in order to effect the resin flow analysis within the mold, a molded part model is divided into elements (the illustrated example employs triangular elements, notwithstanding square elements are available) for application to the calculus of finite elements. For the molded part model, the location and number of the gate G are provided together with a runner, if necessary, to determine the shape of the mold for the flow analysis. Then, a resin to be used is selected to input available information data of the resin properties with subsequent input of the molding conditions such as resin temperature, mold temperature and loading speed for transition into analysis as likely carried out in the conventional method for resin flow analysis in the mold illustrated in FIGS. 2 and 4.

EXAMPLE 1

The mold temperature is fixed at 75° C., while one or more resin temperatures or resin temperatures of the nozzle portion are selected, such as 280° C., 300° C. and 315° C. Then, a plurality of loading times such as 1, 2, 3, 5, 8, 10 and 15 seconds are provided each resin temperature to carry out the sequential analytical calculations. From the resulting calculation data, the maximum resin temperature of all the elements at an average temperature or a medium layer temperature of each element of the model is taken out through the resin temperature distribution data when the loading operation is finished to provide the data for the loading time. The procedures are repeated to provide a graph of data of a characteristic curve view as shown in FIG. 5 with a resin temperature at a predetermined condition for a mold temperature as a parameter to show the loading time as an abscissa and the maximum resin temperature as an ordinate.

Figure 5:
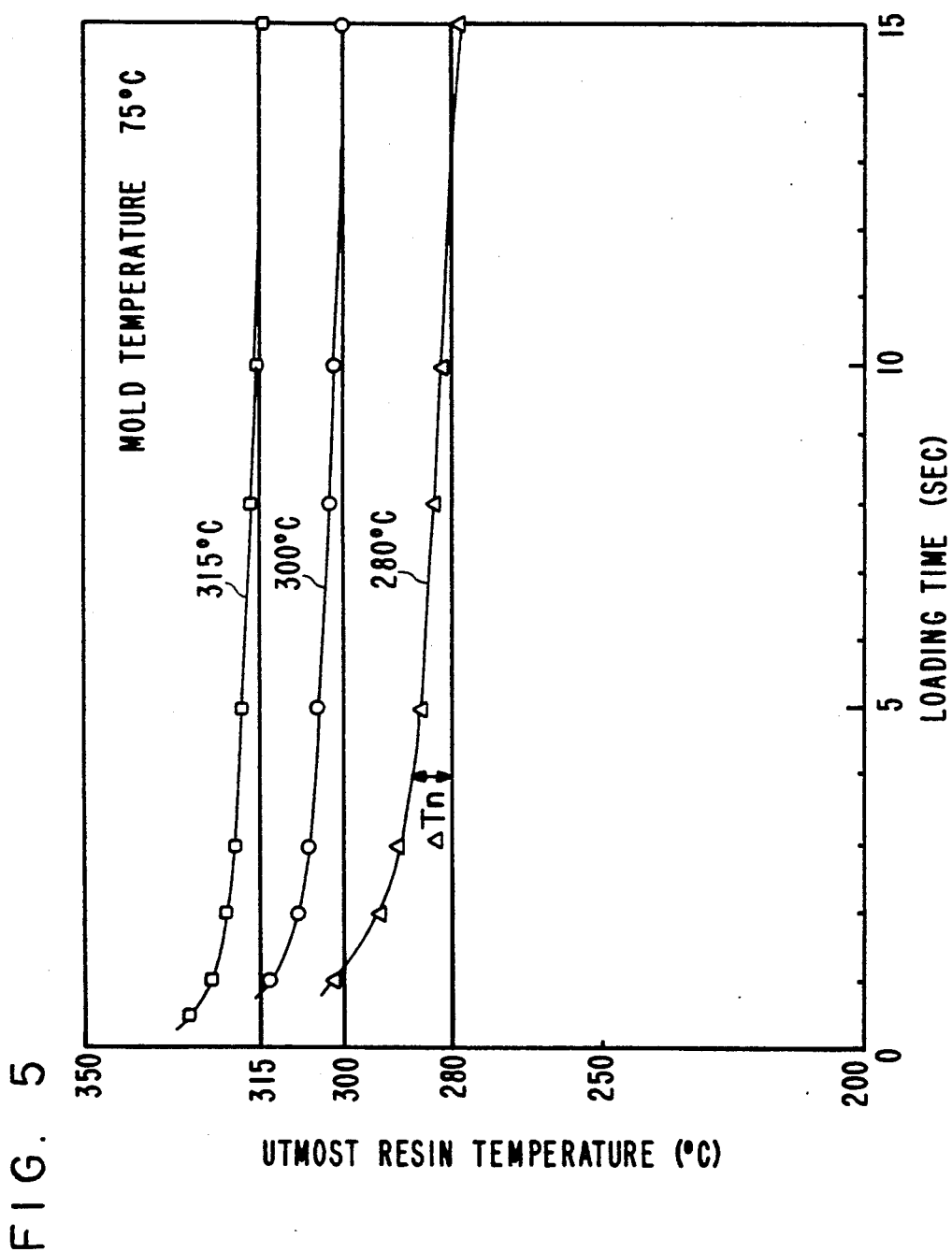
FIG. 5 is a characteristic curve view of the maximum resin temperature against the loading time of the resin temperature as a parameter showing one embodiment of an evaluation method of the flow analysis on molding of the molten material according to the invention.

Then, the characteristic curve as shown in FIG. 5 is represented by the following formula:

$$\Delta Tn = fnK(t) \quad (n=1, 2, 3) \tag{1}$$

In FIG. 5, the reference symbol $\Delta Tn$ represents a difference between the resin temperature at a given loading time and the resin temperature when the loading operation is finished or a temperature increment caused by the shear exothermic heat during the loading operation. Thus, it is desired that the value not be large.

Further, the gradient of each characteristic curve, as shown in FIG. 5, or the differential value $dTn/dt$ of the loading time of the function representing a molten resin temperature with a variable of the loading time shows a stability of the fluctuation of the resin temperature when the loading is finished where the loading time is changed. This value in this event is desired to be small.

On the other hand, the temperature increment $\Delta Tn$ to be caused by the shear exothermic heat and the stability $dTn/dt$ of the resin temperature when the loading is finished according to the fluctuation of the loading time are variable on account of the physical properties of the resin to be used and the shape of the molded part, so that no absolute evaluation is available to fix the absolute value less than a certain value. To obtain more appropriate molding conditions, however, it is important to seize the trend of the fluctuation when the resin temperature or the loading time is changed.

Accordingly, a graphical indication of the graph in FIG. 5 on the display apparatus such as liquid crystal, CRT, plasma and EL is effective to determine appropriate conditions. Furthermore, an indication of the graph in FIG. 1 on the display apparatus ensures to seize the trends of fluctuations $\Delta Tn$ and $dTn/dt$ as hereinbefore described, while a numerical expression of these functions may restrict an appropriate range of the resin temperature on indication of the display apparatus through a dialogue-type operation by giving the critical value to said $\Delta Tn$ and $dTn/dt$.

EXAMPLE 2

The mold temperature is fixed at 60° C., while one or more resin temperatures are selected, such as 200° C., 220° C. and 260° C. with the loading times of 0.2, 0.5, 1, 2, 3 and 4 seconds for each resin temperature for the sequential analysis operations. From the resulting operation data, the minimum resin temperature of each element of the model is picked up by means of the resin temperature distribution data when the loading is finished thereby to provide a data for the loading time. The steps are repeated to obtain a graph of data as a characteristic curve view as shown in FIG. 6 with the loading time as an abscissa and the maximum resin temperature as an ordinate providing the resin temperature at a predetermined mold temperature as a parameter.

Figure 6:
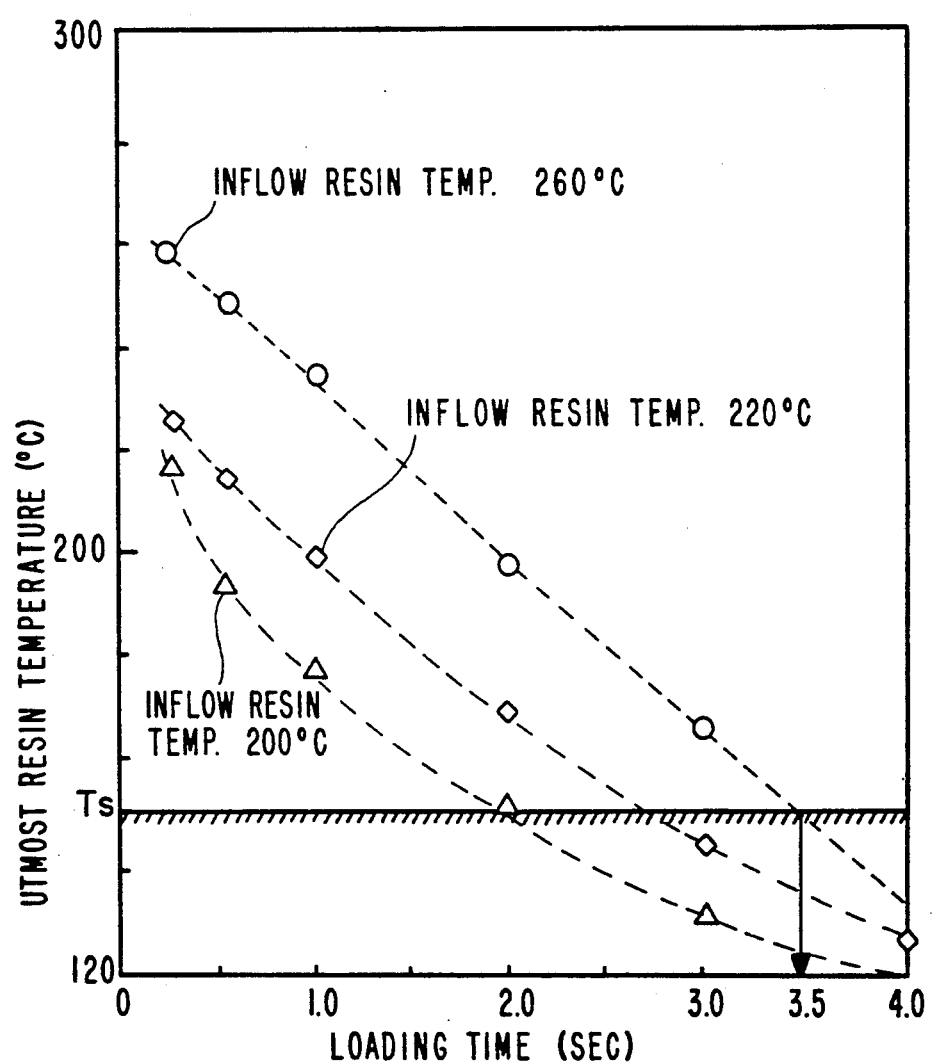
FIG. 6 is a characteristic curve view of the minimum resin temperature against the loading time of the resin temperature as a parameter showing another embodiment according to the invention.
Figure 7:
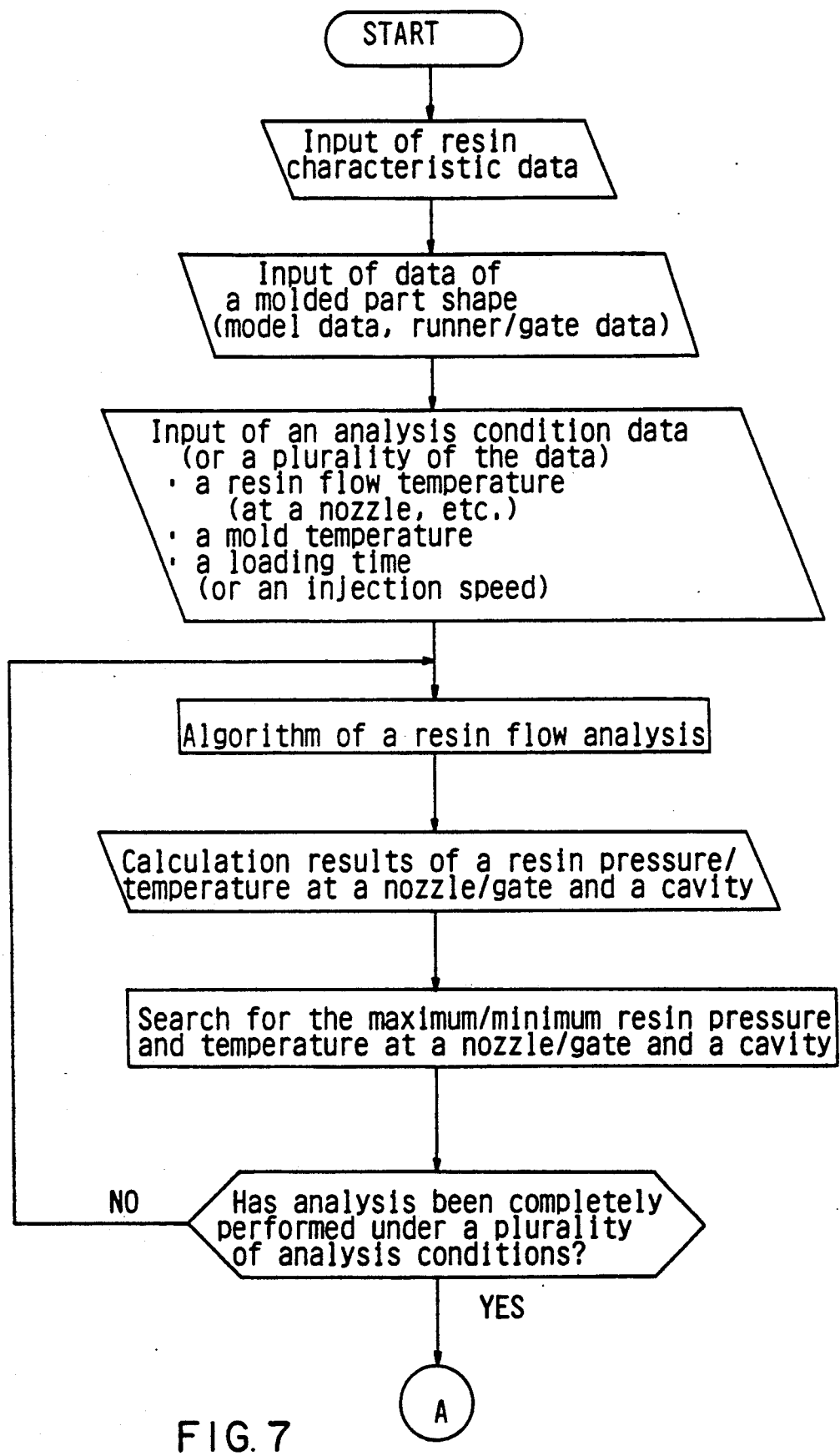
FIGS. 7-9 together form a flow chart of a suitable operating sequence for carrying out the method of the invention.
Figure 8:
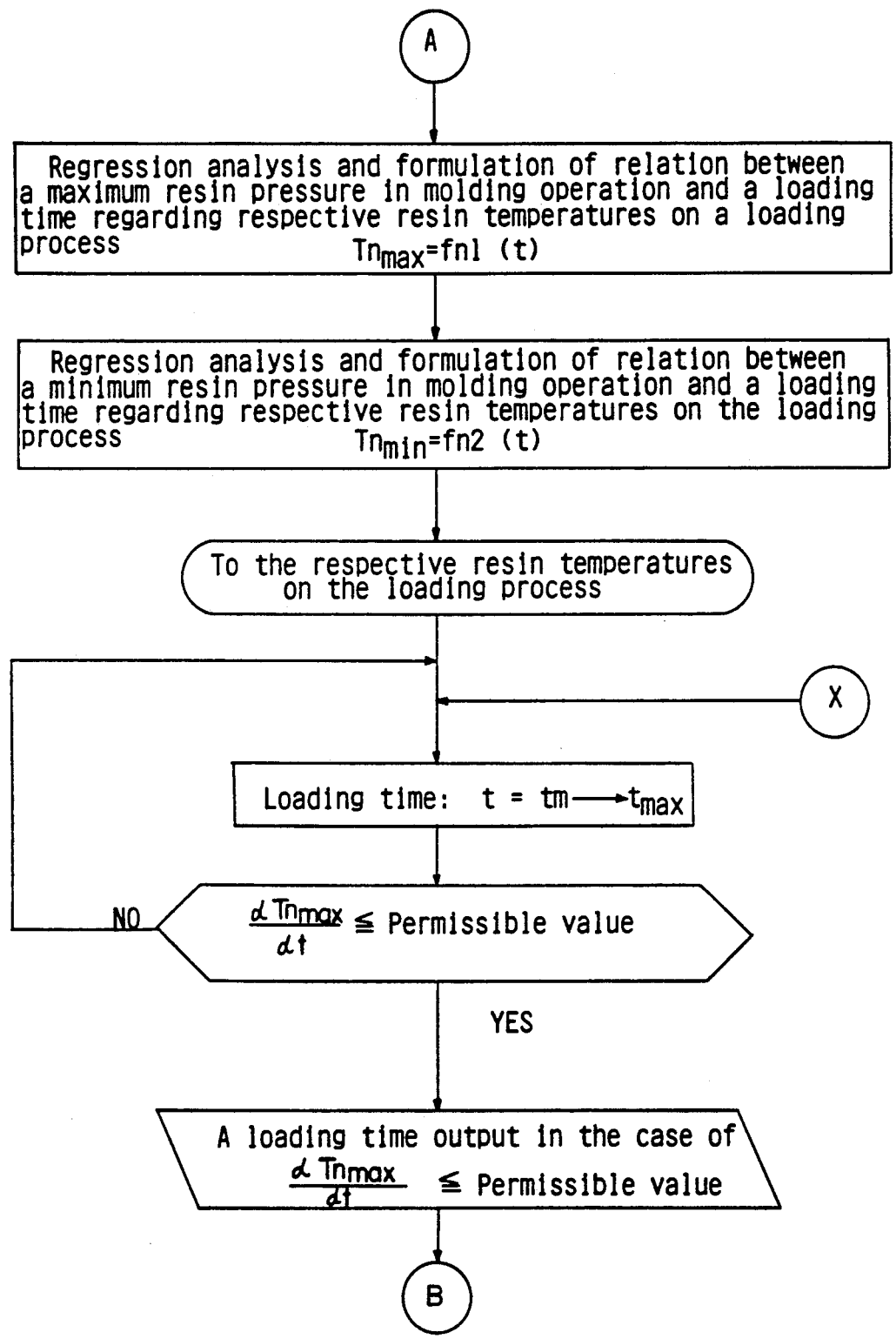
Figure 9:
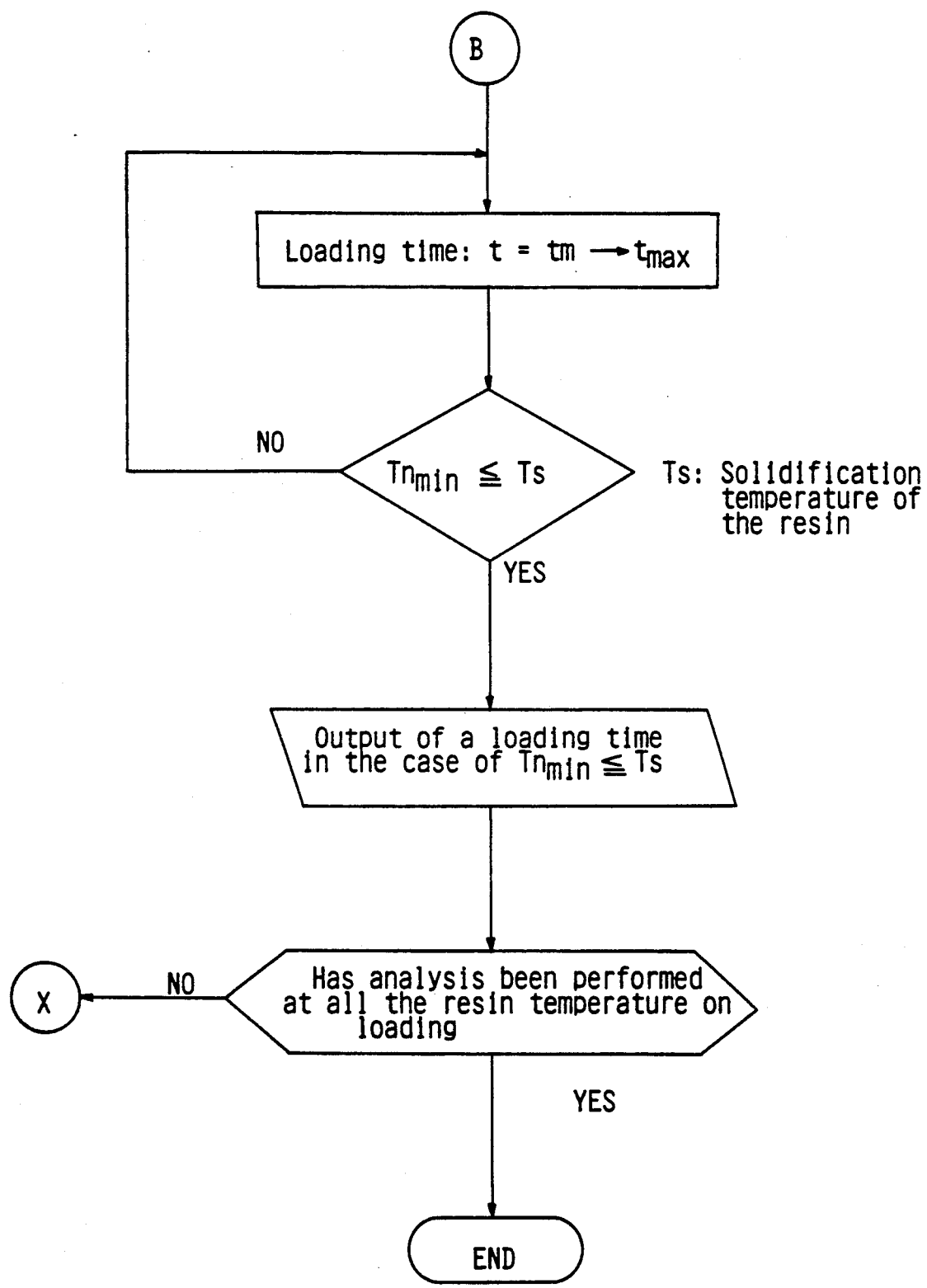

Then, the characteristic curve as shown in FIG. 6 may be formulated to provide the following equation:

$$Tn = fn2(t) \quad (n=1, 2, 3) \tag{2}$$

In FIG. 6, Ts represents a solidification temperature of the resin. Thus, under the zone less than the level of the solidification temperature Ts the region is not susceptible to the resin molding.

Generally in the injection-molded part, according to the value of the thickness thereof and the distance from its gate to its flow end, the flowing becomes imperfect before the resin temperature goes down to the solidification temperature Ts so that the temperature where the function Tn is not less than the standard value (Ts+α) according to the solidification temperature Ts is applicable to an evaluation standard for the possible limitation of the flow.

Difficulties of the molten resin flow are, however, likely to vary in accordance with properties of the resin to be used, the thickness and the shape of the molded part, so that no absolute evaluation is available to define the value α for determination of the criteria value (Ts+α). To obtain more appropriate molding conditions, however, it is important to seize the trend of the fluctuation when the resin temperature or the loading time is changed.

In this example as well, a special indication of the graph in FIG. 6 on the display apparatus, such as liquid crystal, CRT, plasma and EL, is effective to determine appropriate conditions. Further, an indication of the graph in FIG. 1 on the display apparatus ensures to determine the molding impossible region in relation to the standard value (Ts+α), while the formulation of the functions ensures selection of the appropriate range of the loading time as well as the optimum resin temperature based on indication of the display apparatus through the dialogue-type operation by applying the critical value for the value α to provide the standard value (Ts+α).

As apparent from the examples as hereinbefore described, in accordance with the invention, the molten resin viscosity with respect to the resin temperature and the mold temperature may be kept at a predetermined level while the ranges of the minimum resin temperature and the loading time may be conveniently determined under an appropriate condition satisfying the magnitude and stability of the loading pressure.

Further, according to the invention, when the resin flow of the molded part model is analyzed, the molding conditions for obtaining the molded part of high quality may conveniently be provided by means of a simple graphic indication. Furthermore, according to the resulting determination, various appropriate molding conditions may be selected, thereby bringing considerable effects on preparation of the molding program of the molten resin.

Although the invention has been described hereinabove with its preferred examples for the evaluation process of the flow analysis in the molding of the molten resin, many variations and modifications may be made while maintaining the advantages as described hereinabove but without departing from the scope and spirit of the invention, for example, the process may be applicable to molding of the molten materials other than resin, by a die-casting machine.

What is claimed is:

1. An evaluation method for performing a flow analysis for molding a molten material, comprising: dividing a simulated molded part model into a plurality of minute elements and performing numerical analysis thereon;

relating at least one temperature parameter of the molten material to a plurality of loading times; generating a distribution of said at least one temperature parameter of the molten material for each element, over a range of loading time values; calculating an average temperature value for each of said plurality of minute elements as a function of said loading times values; indicating said function graphically on a display apparatus to enable evaluation of molten material temperature and loading time at a predetermined mold temperature; determining desired molding conditions by evaluation of said displayed graphical indication; and controlling a molding process in accordance with said desired molding conditions.

2. The method according to claim 1, wherein the average temperature value of each element after loading is calculated according to a function $Tn = f\, n_1(t)$ of loading time values of a maximum molten material temperature for each of said plurality of elements, said function being evaluated by assigning a critical value to a deviation $\Delta Tn$ between the function of the maximum molten material temperature and a molten material temperature when flowing into the mold, thereby to determine desired ranges of the molten material temperature and loading time.

3. The method according to claim 1, wherein the average temperature value of each element after loading is calculated as a function $Tn = f\, n_1(t)$ of loading time values of a maximum molten material temperature for each element, and critical value is assigned to a differential value $dT/dt$ of said function thereby to evaluate said function to determine desired ranges of the molten material temperature and loading time.

4. The method according to claim 1, wherein the average temperature value of each said element after loading is calculated according to a function $Tn = f\, n_2(t)$ of loading time of a minimum molten material temperature for each element and a critical value according to a solidification temperature $Ts$ of a given molten material is calculated as a function of the minimum molten material pressure, thereby to evaluate said function to determine a temperature range at which molding cannot be carried out, as well as a loading time range.

* * * * *